(12) United States Patent
Littau

(10) Patent No.: US 6,394,382 B1
(45) Date of Patent: May 28, 2002

(54) WASHER AND BEARING SYSTEM FOR FISHING REEL

(75) Inventor: Christopher Shawn Littau, Bartlesville, OK (US)

(73) Assignee: Brunswick Corporation, Tulsa, OK (US)

( * ) Notice: Subject to any disclaimer, the term of this patent is extended or adjusted under 35 U.S.C. 154(b) by 0 days.

(21) Appl. No.: 09/731,310

(22) Filed: Dec. 6, 2000

(51) Int. Cl.[7] .................. A01K 89/00; A01K 89/01; A01K 89/015
(52) U.S. Cl. .................. 242/321; 242/320
(58) Field of Search .................. 242/321, 320, 242/322

(56) References Cited

U.S. PATENT DOCUMENTS

| | | | | |
|---|---|---|---|---|
| 1,912,086 A | * | 5/1933 | Mayhew | 242/321 |
| 3,882,986 A | * | 5/1975 | Howard | 197/1 R |
| 4,074,517 A | * | 2/1978 | Tatsumi et al. | 58/140 R |
| 4,444,442 A | * | 4/1984 | Hojo et al. | 308/2 A |
| 4,568,642 A | * | 2/1986 | Deforrest et al. | 433/132 |
| 5,855,330 A | * | 1/1999 | Kobayashi | 242/231 |
| 6,150,745 A | * | 11/2000 | Carpenter | 242/321 |

\* cited by examiner

*Primary Examiner*—Emmanuel M. Marcelo
(74) *Attorney, Agent, or Firm*—Wood, Phillips, VanSanten, Clark & Mortimer

(57) ABSTRACT

A fishing reel having a frame and an operating mechanism on the frame. A first element is one of a) part of the frame and b) mounted on the frame. The operating mechanism has a second element mounted on the frame for guided movement relative to the first element. The operating mechanism further includes a jewel element which resides between the first and second elements so as to guide movement of the second element relative to the first element.

32 Claims, 5 Drawing Sheets

WASHER AND BEARING SYSTEM FOR FISHING REEL

BACKGROUND OF THE INVENTION

1. Field of the Invention

This invention relates to fishing reels and, more particularly, to a fishing reel which uses jewel bearings and/or washers between relatively movable parts.

2. Background Art

Fishing reels are made in a number of different forms, among which are those classified as spinning reels, spin cast reels, casting reels, fly fishing reels, etc. Each type of fishing reel has relatively moving parts that are spaced and/or guided for movement relative to each other by washers and/or bearings. Conventionally, these washers and bearings have been made from metal or plastic.

Metal and plastic washers/bearings have functioned effectively in the fishing reel industry for decades. However, designers are constantly seeking ways to improve fishing reel technology. The washers and bearings used in the past have generally had two drawbacks common to washers and bearings utilizing these materials. First, the washers and bearings account for a significant amount of frictional resistance which may detract from the performance of a fishing reel. Second, the washers and bearings are prone to wear, particularly after extended use. This wear could have a number of undesirable consequences. First, the wear could compromise smooth relative movement between parts. Second, the wear could result in a shifting between reel parts that could detract from reel performance and potentially cause binding between relatively movable parts. Third, wear or failure of the washers or bearings could ultimately result in a failure of a part of the fishing reel mechanism.

While the industry has conventionally used metal and plastic for washers and bearings, improvements in this area are desirable.

SUMMARY OF THE INVENTION

In one form, the invention is directed to a fishing reel having a frame and an operating mechanism on the frame. A first element is one of a) part of the frame and b) mounted on the frame. The operating mechanism has a second element mounted on the frame for guided movement relative to the first element. The operating mechanism further includes a jewel element which resides between the first and second elements so as to guide movement of the second element relative to the first element.

In one form, the jewel element is an end washer.

In one form, the jewel element is a bearing, which may be a thrust bearing.

In one form, one of the first and second elements extends fully through the jewel element.

In one form, the jewel element has an opening therethrough and one of the first and second elements extends at least partially through the opening.

In one form, the jewel element has an opening at least partially therethrough and at least one of the first and second elements extends at least partially into the opening.

In one form, the first element is a shaft that is movable around an axis.

In one form, the operating mechanism includes a line carrying spool that is rotatable around a first axis and a crank handle that is rotatable around a second axis by an operator to rotate the line carrying spool around the first axis to thereby retrieve fishing line onto the line carrying spool. The first axis is substantially parallel to the second axis.

In another form, the operating mechanism has a line carrying spool, a rotor that is rotatable around a first axis, a bail assembly on the rotor that directs fishing line onto the line carrying spool as the rotor is rotated around the first axis, and a crank handle that is rotatable by an operator around a second axis to rotate the rotor around the first axis.

The second axis may be transverse to the first axis.

In another form, the operating mechanism has a line carrying spool, a spinner head that is rotatable around the first axis to wrap fishing line onto the line carrying spool, and a crank handle that is rotatable around a second axis by an operator to rotate the spinner head around the first axis.

In one form, the second axis is transverse to the first axis.

The operating mechanism may include a line carrying spool that is rotatable around a first axis to retrieve line onto the line carrying spool.

The operating mechanism may have a line carrying spool and a third element that is rotatable relative to the spool by an operator to thereby direct line onto the line carrying spool.

In one form, the first element is a shaft on a spool with a first end which extends fully through the jewel element.

In one form, the first shaft end has a free edge and the jewel element is an end washer to which the free edge of the first shaft end abuts.

In one form, the first end of the spool extends through the jewel element and the first free edge abuts to a second jewel element.

In one form, the first element is a shaft on the spool with axially opposite first and second free ends, the jewel element abuts to the first free end of the shaft, and there is a second jewel element that abuts to the second free end of the shaft.

In one form, a third jewel element is provided at one of the first and second free ends of the shaft and abuts to the one of the first and second free ends of the shaft.

DETAILED DESCRIPTION OF THE DRAWINGS

Figure 1:
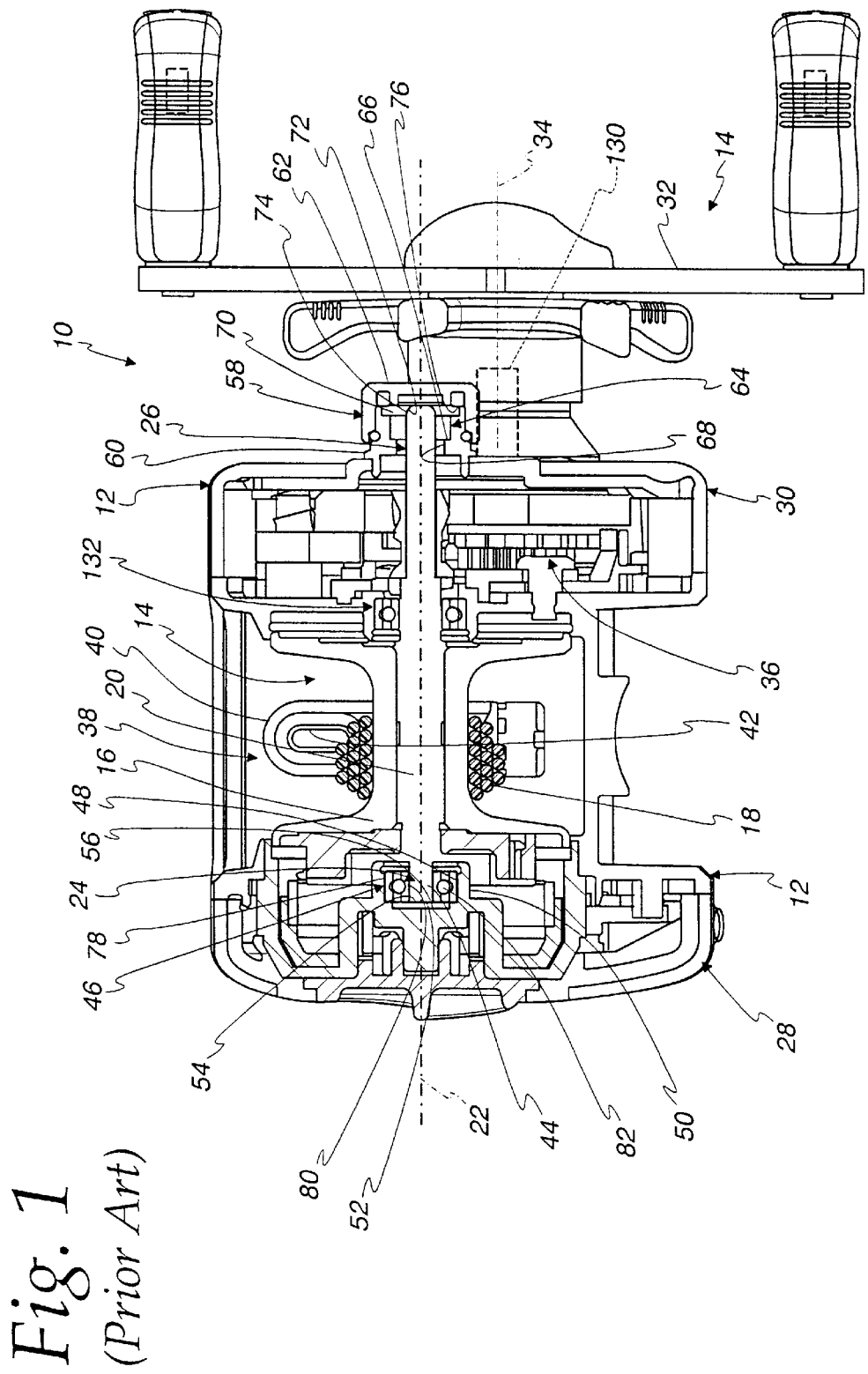
FIG. 1 is a partial cross-sectional view of a bait cast fishing reel, of the type suitable for incorporation into the present invention, including a rotary shaft for directing fishing line onto a line carrying spool.

Referring initially to FIG. 1, one form of fishing reel, suitable for incorporation of the present invention, is shown at 10. The fishing reel 10 is commonly referred to as a bait cast reel, or a casting reel. The structure and operation of a similar bait casting reel is described in detail in U.S. Pat. No. 5,839,682, entitled "Fishing Reel With Removable Side Cover Assembly", which patent is incorporated herein by reference. Only the general operation of the fishing reel 10 will be described herein to establish the environment for the present invention.

The fishing reel 10 has a frame 12 upon which an operating mechanism 14 is mounted. The operating mechanism 14 includes a line carrying spool 16 upon which a supply of fishing line 18 is wrapped. A shaft 20 extends through the spool 16 and defines the central, rotary axis 22 for the spool 16. The shaft 20 has first and second ends 24, 26 projecting axially oppositely from the spool 16 and supported for rotation by spaced frame parts 28, 30, respectively.

The spool 16 is rotatable by an external crank handle 32, as an incident of which fishing line 18 is wrapped around the spool 16. The crank handle 32 is rotatable about an axis 34, which is spaced from and substantially parallel to, the axis 22. A rotational torque applied to the crank handle 32 is transmitted through a drive train 36 to the shaft 20. Rotation of the crank handle 32 also operates a level line guide mechanism 38 at the front of the fishing reel 10, which includes a guide element 40 with an opening 42 through which line 18 projecting forwardly from the spool 16 extends. As the crank handle 32 is operated, the guide element 40 oscillates parallel to the spool axis 22 to thereby cause an even distribution of line 18 across the spool 16.

The fishing reel 10 shown in FIG. 1 is one currently offered by the assignee herein. As currently offered, the first shaft end 24 has a reduced diameter portion 44 which projects through a conventional roller bearing 46 supported in a blind bore 48 on a frame element 50. A free edge 52 of the first shaft end 24 is abutted to a flat thrust bearing 54 at a base surface 56 bounding the bore 48.

The second shaft end 26 is supported by a frame element 58 consisting of a cylindrical lug 60 that is threadably engaged with a cap 62. Rotation of the cap 62 effects shifting of the cap 62 along the axis 22.

A roller bearing 64 surrounds the second shaft end 26 and nests in a receptacle 66 defined by a stepped bore 68 through the lug 60.

A thrust washer 70 has a tapered bore 72 which receives a complementarily-shaped free edge 74 at the second shaft end 26. The thrust washer 70 is abuttable to an axially facing surface 76 on the inside of the cap 62. Accordingly, rotational movement of the cap 62 in one direction effects right-to-left shifting of the cap 62 in FIG. 1, causing the surface 76 to bear the thrust washer 70 against the free edge 74 of the second shaft end 26, and thereby urging the shaft 20 in a right-to-left direction.

Typically, the roller bearings 46, 64 have a similar construction. Exemplary roller bearing 46 consists of an outer race 78 and an inner race 80 between which equidistantly spaced bearing elements 82 are situated. The bearing elements 82 are shown as spherical elements, but are alternatively made in cylindrical form.

Typically, the inner race 80, outer race 78, and bearing elements 82 are made from metal. Inevitably there is wear that occurs by reason of the metal on metal contact. By reason of having moving parts, the possibility of misalignment or seizing of elements arises.

The thrust bearing 54 and thrust washer 70 are also typically made from metal so that they are likewise prone to wear after extended contact with the rotating shaft 20.

Additionally, there may be a relatively high coefficient of friction between the shaft 20 and the thrust bearing 54 and thrust washer 70, as well as between the metal parts making up each of the roller bearings 46, 64. This may detract from the overall smoothness of reel operation.

According to the invention, one or all of the roller bearings 46, 64, thrust bearing 54, and thrust washer 70 may be replaced by jewel elements, as shown in FIGS. 2–5. In each case, the jewel element is made preferably from sapphire, ruby, glass, and/or synthetic sapphire, ruby, and/or glass.

Figure 2:
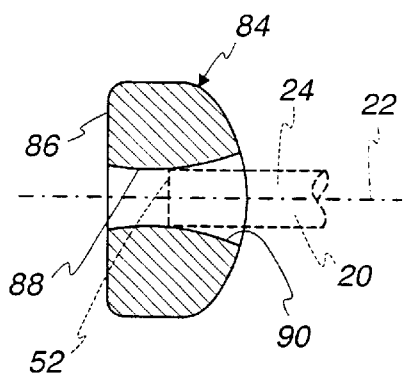
FIG. 2 is a cross-sectional view of a jewel element which is used to support an end of the shaft on the fishing reel of FIG. 1.

Referring initially to FIG. 2, a jewel element is shown at 84 which performs the function of the thrust bearing 54 and roller bearing 46. The jewel element 84 has a body 86 with a through opening 88 defining a curved, varying diameter, surface portion 90 which is abuttable to the free edge 52 of the first end 24 of the shaft 20, which extends only partially therethrough. The body 86 can be appropriately fixed to the frame element 50, whereby the shaft 20 rotates directly against and relative to the surface part 90. The surface part 90 thus limits axial shifting of the shaft 20 and at the same time guides relative rotation of the shaft 20 around the axis 22.

It should be understood that the configuration of the jewel element 84 can vary considerably from that shown. Also, the end 24 of the shaft 20 can be varied considerably from that shown to cooperate with the jewel element 84 to afford the desired operating characteristics. As a further variation, the jewel element 84 having the same or different configuration, could be fixed to the shaft end 24 so as to rotate relative to the frame 12.

Figure 3:
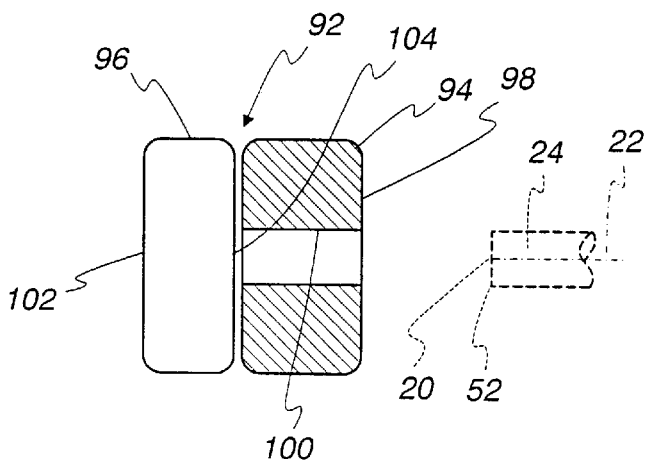
FIG. 3 is a view as in FIG. 2 of a jewel assembly to support the end of the shaft on the fishing reel of FIG. 1 and including two jewel elements.

In FIG. 3, a jewel element assembly is shown at 92 consisting of a first jewel element 94 and a second jewel element 96. The first jewel element 94 has a body 98 with a uniform diameter through opening 100 to guide the shaft end 24 in rotation around the axis 22. A thrust bearing function is performed by the second jewel element 96, which has a body 102 with a surface 104 adjacent the axial end of the through opening 100 to abut to the free edge 52 of the shaft 20 to limit axial movement thereof.

Figure 4:
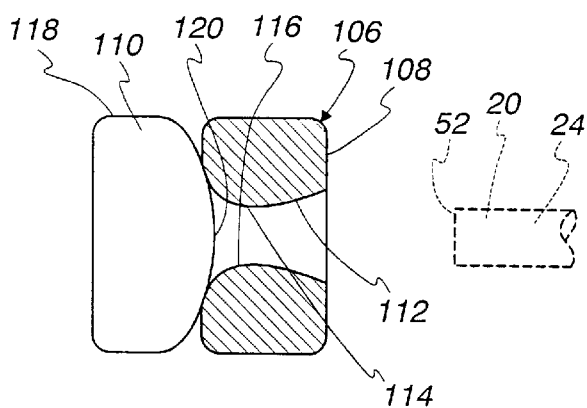
FIG. 4 is a view as in FIG. 3 of a modified form of jewel assembly to support the end of the shaft on the fishing reel of FIG. 1.

A further variation of jewel element assembly is shown at 106 in FIG. 4. The jewel element assembly 106 consists of a first jewel element 108 and second jewel element 110. The first jewel element 108 has an hourglass-shaped through opening 112 which receives the end 24 of the shaft 20. The through opening 112 is dimensioned so that the smallest diameter portion 114 of the surface 116 bounding the through opening 112 closely surrounds the shaft end 24 to guide rotation thereof. This opening configuration will potentially accommodate slight misalignment of the shaft 20 from its intended axis.

The second jewel element 110 has a body 118 with a convex surface 120 that blocks one end of the through opening 112 for abutment to the free edge 52 of the shaft 20. The second jewel element 110 thus performs the function of a thrust bearing, and by reason of the convex configuration of the surface 120, reduces the surface contact area between the shaft 22 and the surface 120 for potentially low friction operation.

Figure 5:
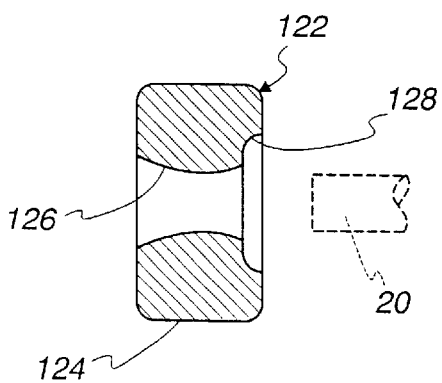
FIG. 5 is a view as in FIG. 2 of a modified form of jewel element used to support the end of the shaft on the fishing reel in FIG. 1.

A further form of jewel element is shown at 122 in Fig. 5. The jewel element 122 has a body 124 with a through opening 126 similar to the through opening 112 shown on the jewel element 106 in FIG. 4. An annular undercut 128 forms a cup-shaped reservoir into which oil or other lubricant can be placed. The shaft 20 otherwise cooperates with the jewel element 122 in the same manner as it cooperates with the jewel element 106 in FIG. 4.

While each of the jewel elements is shown to have a homogenous composition, the jewel elements can be integrated into another part, made from metal, or other material (s). It is desirable that at least the contact regions between the relatively moveable elements be made primarily from sapphire, ruby, glass, or synthetic sapphire, ruby, or glass, or the like.

Many different configurations for the jewel elements, other than those shown, are contemplated. Additionally, the element which cooperates with the jewel element may likewise be modified from that shown to achieve optimal, desired operating characteristics.

While the invention has been described in FIGS. 2–5 to replace the roller bearing 46 and/or thrust bearing 54 at the shaft end 24, the same arrangement can be used to replace one or both of the roller bearing 64 and/or thrust washer 70 at the other shaft end 26.

Similarly, the use of the jewel elements is not limited to the connection between the shaft 20 and frame 12. The same, or like jewel elements, can be used between any two relatively movable elements. For example, the crank handle 32 is mounted upon a shaft 130 which is journalled for rotation relative to the frame 12. One or more jewel elements can be used to guide relative movement between these elements. As another example, the jewel elements could be substituted for the roller bearing 132 surrounding the shaft 20 at an axially intermediate location. The inventive concept can be employed in virtually any part of the fishing reel 10 wherein bearings, roller bearings, thrust washers and thrust bearings are utilized.

Figure 6:
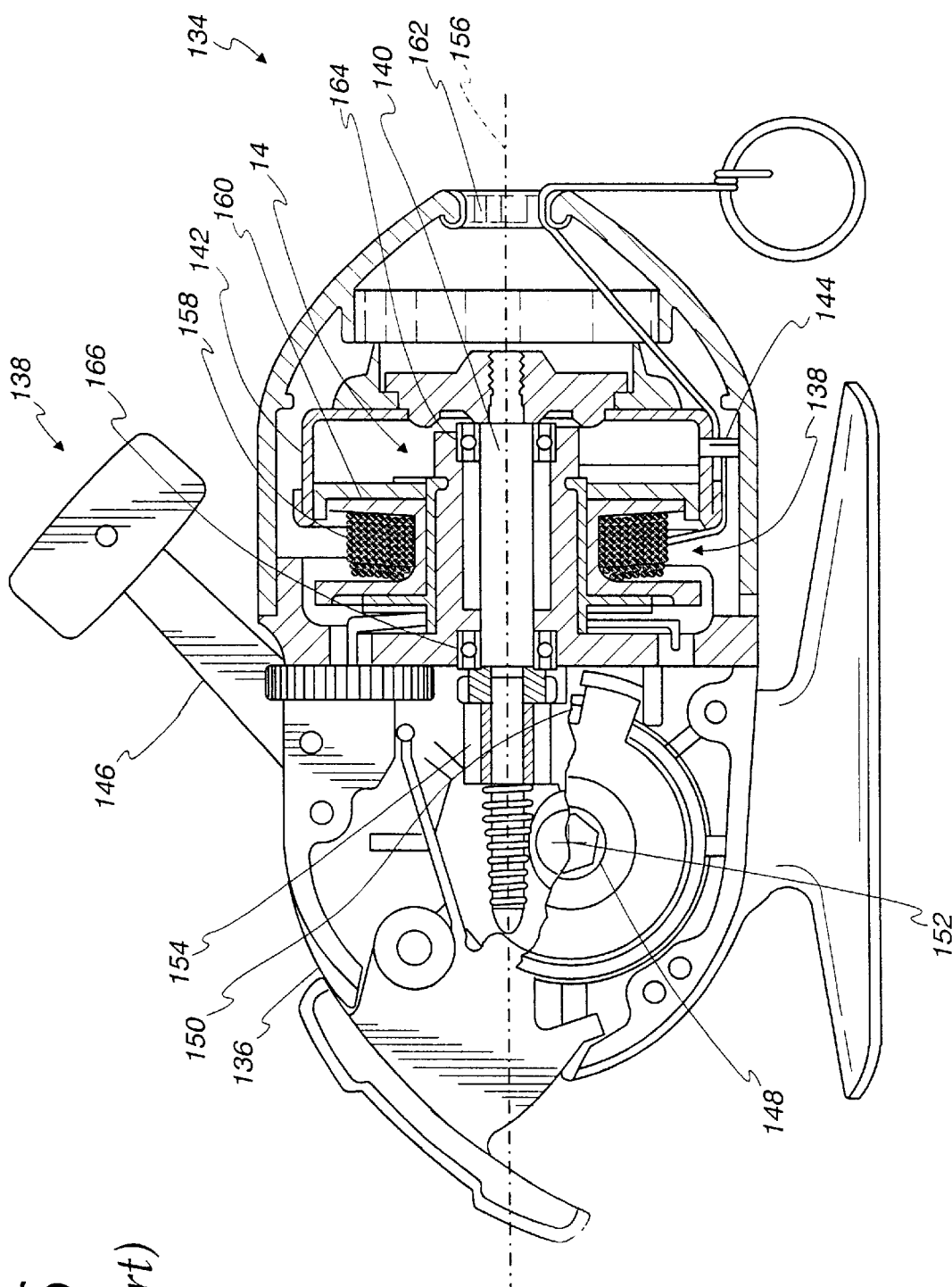
FIG. 6 is a cross-sectional view of a spin cast-type fishing reel which is another type of fishing reel suitable for incorporation of the present invention.

In FIG. 6, another form of fishing reel is shown at 134 of the type that is suitable for incorporation of the present invention. This reel 134 is referred to as a spin cast-type. Again, the details of the operation of the fishing reel 134 need not be discussed herein to understand the present invention. The structural details and operation of the fishing reel 134 are described fully in U.S. Pat. No. 5,775,613, entitled "Anti-Reverse System for a Fishing Reel", which is incorporated herein by reference. The fishing reel 134 has a frame 136 with an operating mechanism 138 thereon. The operating mechanism 138 includes a center shaft 140 which extends in a fore-and-aft direction. A spinner head 142 is mounted to the forward end of the center shaft 140 and carries a radially extending, retractable pick-up pin 144.

An external crank handle 146 is operable to rotate a laterally extending crank shaft 148 which carries a drive gear 150, having the form of a face gear. The drive gear 150 is rotatable through the crank handle 146 around a laterally extending axis 152. The drive gear 156 is in mesh with a pinion gear 154 adjacent to the rear end of the center shaft 140.

In operation, pivoting of the crank handle 146 around the axis 152 drives the center shaft 140 and spinner head 142 around a fore and aft axis 156 which is orthogonal to the axis 152. As this occurs, fishing line 158 extending from a line carrying spool 160 through a front opening 162 is caused to be wrapped around the spool 160.

The center shaft 140 is supported for rotation relative to the frame 136 by front and rear roller bearings 164, 166. The roller bearings 164, 166 can be substituted for by a jewel element, such as the jewel element 94 shown in FIG. 3. If a thrust function is desired, the jewel elements 84, 96 or 110 could be selectively utilized alone or in conjunction with another jewel element. Jewel elements could also be used to support the crank shaft 148 for rotation around its axis 152.

Figure 7:
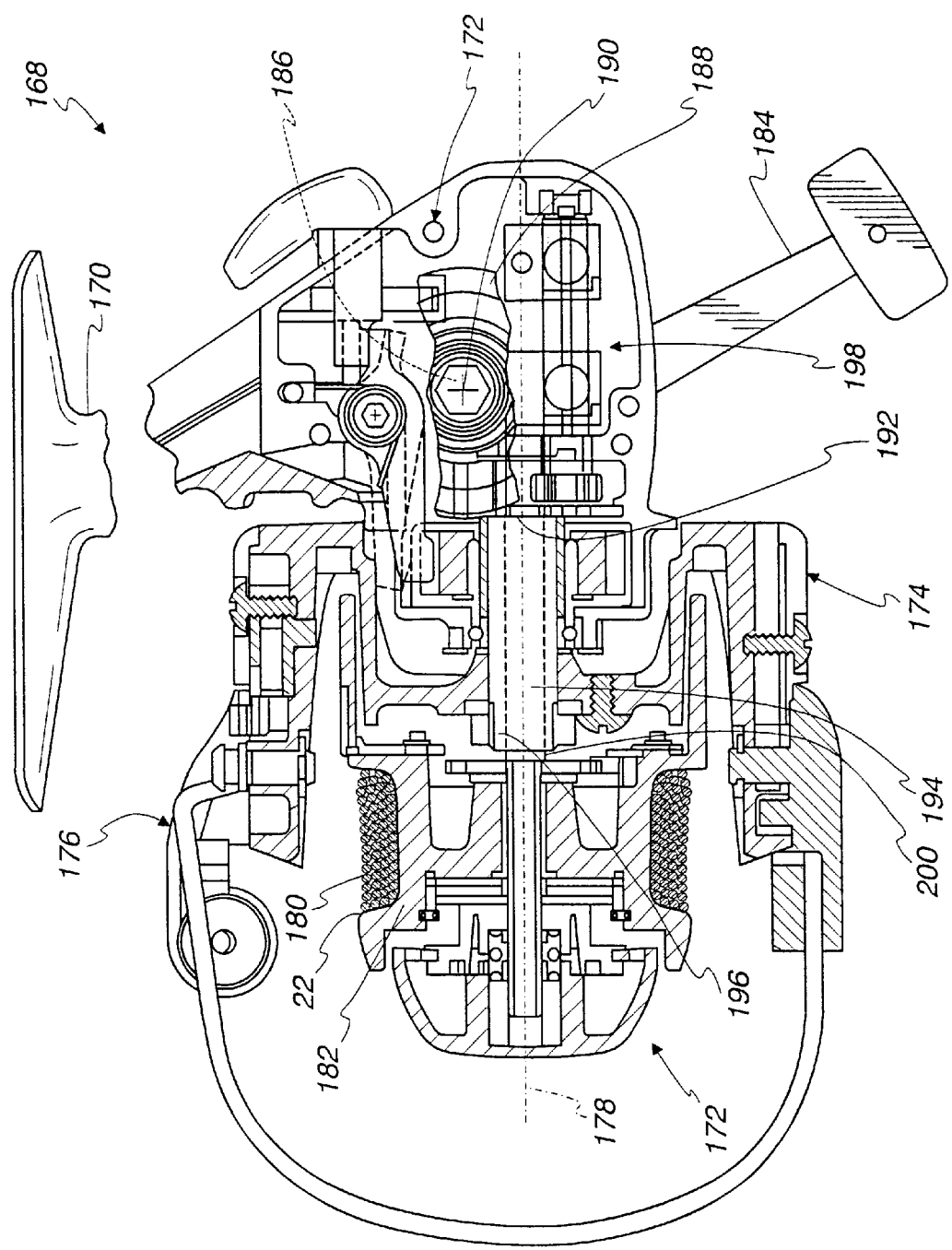
FIG. 7 is a cross-sectional view of a spinning-type fishing reel which is another type of fishing reel suitable for incorporation of the present invention.

In FIG. 7 a spinning-type fishing reel is shown at 168 as another type of fishing reel into which the present invention can be incorporated. The fishing reel 168 consists of a frame 170 with an operating mechanism 172 thereon. Details of the operating mechanism 172, and its function, are described fully in U.S. Pat. No. 5,738,292, entitled "Selective Continuous Anti-Reverse Mechanism for a Fishing Reel", which is incorporated herein by reference.

Briefly, the operating mechanism 172 consists of a rotor 174 with a bail assembly 176 thereon. Rotation of the rotor 174 around a central axis 178 causes the bail assembly 176 to wrap fishing line 180 around a line carrying spool 182 at the front of the fishing reel 168.

The rotor 174 is driven in rotation by operation of an external crank handle 184, which drives a crank shaft 186 and a face gear 188 thereon around a laterally extending axis 190. The face gear 188 is in mesh with a pinion gear 192 which rotates with a sleeve 194 around the axis 178. The forward end 196 of the sleeve 194 is fixed to the rotor 174.

Rotation of the crank handle 184 also operates an oscillating mechanism at 198 which moves a shaft 200 within the sleeve 194 in a reciprocating path. The shaft 200 is connected to the spool 182 so that the spool 182 moves in a fore-and-aft direction repetitively as the bail assembly 176 on the rotor 174 wraps fishing line 180 around the spool 182.

In this embodiment, a roller bearing 202 surrounds the sleeve 194 and guides movement of the sleeve 194 relative to the frame 170. According to the invention, the roller bearing 202 may be replaced by a jewel element, such as one or more of the jewel elements shown in FIGS. 2–5. Similarly, a bearing, roller bearing, thrust bearing, or thrust washer associated with the laterally extending shaft 186 may be replaced with one or more of the jewel elements shown in FIGS. 2–5, or other types of jewel elements which might be selected by a designer based upon desired operating characteristics.

Figure 8:
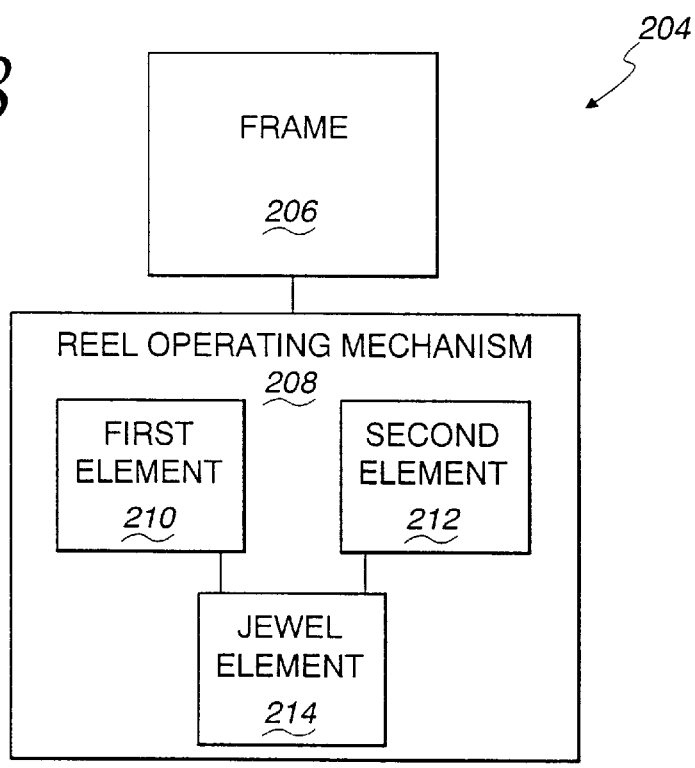
FIG. 8 is a schematic representation of one generic form of fishing reel having a jewel element incorporated according to the present invention to guide relative movement between the first and second elements.

In summary, as shown in FIG. 8, the invention contemplates use of a jewel element in any type of fishing reel, as shown generically at 204, having a frame 206 and a reel operating mechanism 208 which includes a first element 210 and a second element 212 guidingly movable relative to the first element 210, as in rotation. The jewel element 214 is interposed between cooperating surfaces on the first and second elements 210, 212.

Figure 9:
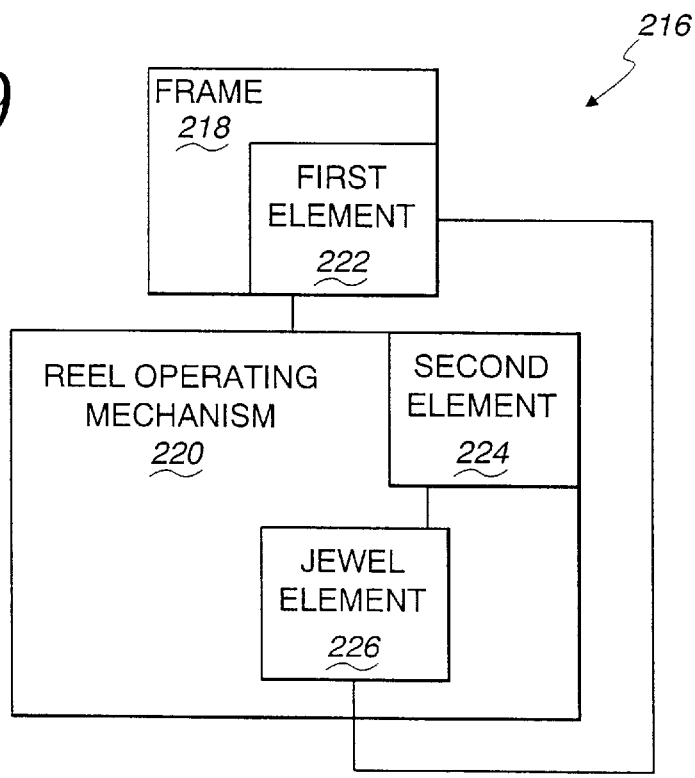
FIG. 9 is a view as in FIG. 8 with a modified form of fishing reel.

In FIG. 9, a variation of the fishing reel 204 is shown at 216. The fishing reel 216, also shown generically, consists of a frame 218 and a reel operating mechanism 220. In this embodiment, a first element 222 is part of the frame 218, whereas a second element 224, which moves guidingly relative to the first element 222, is part of the reel operating mechanism 220. The jewel element 226 is interposed between the first and second elements 222, 224.

The foregoing disclosure of specific embodiments is intended to be illustrative of the broad concepts comprehended by the invention.

What is claimed is:

1. A fishing reel comprising:

a frame;

an operating mechanism on the frame; and a first element that is one of a) a part of the frame and b) mounted on the frame, the operating mechanism comprising a second element mounted on the frame for guided movement relative to the first element, the operating mechanism further comprising a jewel element which resides between the first and second elements so as to guide movement of the second element relative to the first element, wherein the jewel element comprises a convex surface which acts against the second element and guides movement of the second element relative to the first element.

2. The fishing reel according to claim 1 wherein the jewel element comprises an end washer.

3. The fishing reel according to claim 1 wherein the jewel element comprises a bearing.

4. The fishing reel according to claim 3 wherein the bearing comprises a thrust bearing.

5. The fishing reel according to claim 1 wherein the second element comprises a shaft that is movable around an axis.

6. The fishing reel according to claim 1 wherein the operating mechanism comprises a line carrying spool that is rotatable around a first axis and a crank handle that is rotatable around a second axis by an operator to rotate the line carrying spool around the first axis to thereby retrieve fishing line onto the line carrying spool, wherein the first axis is substantially parallel to the second axis.

7. The fishing reel according to claim 1 wherein the operating mechanism comprises a line carrying spool, a rotor that is rotatable around a first axis, a bail assembly on the rotor that directs fishing line onto the line carrying spool as the rotor is rotated around the first axis, and a crank handle that is rotatable by an operator around a second axis to rotate the rotor around the first axis.

8. The fishing reel according to claim 7 wherein the second axis is transverse to the first axis.

9. The fishing reel according to claim 1 wherein the operating mechanism comprises a line carrying spool, a spinner head that is rotatable around a first axis to direct fishing line onto the line carrying spool, and a crank handle that is rotatable around a second axis by an operator to rotate the spinner head around the first axis.

10. The fishing reel according to claim 9 wherein the second axis is transverse to the first axis.

11. The fishing reel according to claim 1 wherein the operating mechanism comprises a line carrying spool that is rotatable around a first axis to retrieve line onto the line carrying spool.

12. The fishing reel according to claim 11 wherein the second element comprises a shaft on the spool and having a first end, the first shaft end has a free edge and the jewel element comprises an end washer to which the free edge of the first shaft end abuts.

13. The fishing reel according to claim 11 wherein the second element comprises a shaft on the spool with axially opposite first and second free ends, the jewel element abuts to the first free end of the shaft and there is a second jewel element that abuts to the second free end of the shaft.

14. The fishing reel according to claim 13 wherein there is a third jewel element at one of the first and second free ends of the shaft to which the one of the first and second free ends of the shaft abuts.

15. The fishing reel according to claim 1 wherein the operating mechanism comprises a line carrying spool and a third element that is rotatable relative to the spool by an operator to thereby direct line onto the line carrying spool.

16. A fishing reel comprising:

a frame;

an operating mechanism on the fra me; and a first element that is one of a) a part of the frame and b) mounted on the frame, the operating mechanism comprising a second element mounted on the frame for guided movement relative to the first element, the operating mechanism further comprising a jewel element which resides between the first and second elements so as to guide movement of the second element relative to the first element, wherein one of the first and second elements extends fully through the jewel element.

17. A fishing reel comprising:

a frame;

an operating mechanism on the frame; and a first element that is one of a) a part of the frame and b) mounted on the frame, the operating mechanism comprising a second element mounted on the frame for guided movement relative to the first element, the operating mechanism further comprising a jewel element which resides between the first and second elements so as to guide movement of the second element relative to the first element, wherein the jewel element has an opening therethrough and one of the first and second elements extends at least partially through the opening.

18. A fishing reel comprising:

a frame;

an operating mechanism on the frame; and a first element that is one of a) a part of the frame and b) mounted on the frame, the operating mechanism comprising a second element mounted on the frame for guided movement relative to the first element, the operating mechanism further comprising a jewel element which resides between the first and second elements so as to guide movement of the second element relative to the first element, wherein the jewel element has an opening at least partially therethrough and at least one of the first and second elements extends at least partially into the opening.

19. The fishing reel according to claim 18 wherein the second element comprises a shaft that is movable around an axis.

20. The fishing reel according to claim 18 wherein the operating mechanism comprises a line carrying spool that is rotatable around a first axis and a crank handle that is rotatable around a second axis by an operator to rotate the line carrying spool around the first axis to thereby retrieve fishing line onto the line carrying spool, wherein the first axis is substantially parallel to the second axis.

21. The fishing reel according to claim 18 wherein the operating mechanism comprises a line carrying spool, a rotor that is rotatable around a first axis, a bail assembly on the rotor that directs fishing line onto the line carrying spool as the rotor is rotated around the first axis, and a crank handle that is rotatable by an operator around a second axis to rotate the rotor around the first axis.

22. The fishing reel according to claim 21 wherein the second axis is transverse to the first axis.

23. The fishing reel according to claim 18 wherein the operating mechanism comprises a line carrying spool, a spinner head that is rotatable around a first axis to direct fishing line onto the line carrying spool, and a crank handle that is rotatable around a second axis by an operator to rotate the spinner head around the first axis.

24. The fishing reel according to claim 23 wherein the second axis is transverse to the first axis.

25. The fishing reel according to claim 18 wherein the operating mechanism comprises a line carrying spool that is rotatable around a first axis to retrieve line onto the line carrying spool.

26. The fishing reel according to claim 25 wherein the second element comprises a shaft on the spool and having a first end, the first shaft end has a free edge and the jewel element comprises an end washer to which the free edge of the first shaft end abuts.

27. The fishing reel according to claim 25 wherein the second element comprises a shaft on the spool with axially opposite first and second free ends, the jewel element abuts to the first free end of the shaft and there is a second jewel element that abuts to the second free end of the shaft.

28. The fishing reel according to claim 27 wherein there is a third jewel element at one of the first and second free ends of the shaft to which the one of the first and second free ends of the shaft abuts.

29. The fishing reel according to claim 18 wherein the operating mechanism comprises a line carrying spool and a third element that is rotatable relative to the spool by an operator to thereby direct line onto the line carrying spool.

30. A fishing reel comprising:

a frame;

an operating mechanism on the frame; and a first element that is one of a) a part of the frame and b) mounted on the frame, the operating mechanism comprising a second element mounted on the frame for guided movement relative to the first element, the operating mechanism further comprising a jewel element which resides between the first and second elements so as to guide movement of the second element relative to the first element, wherein the operating mechanism comprises a line carrying spool that is rotatable around a first axis to retrieve line onto the line carrying spool that is rotatable around a first axis to retrieve line onto the line carrying spool, wherein the second element comprises a shaft on the spool and having a first end and the first end extends fully through the jewel element.

31. A fishing reel comprising:

a frame;

an operating mechanism on the frame; and a first element that is one of a) a part of the frame and b) mounted on the frame, the operating mechanism comprising a second element mounted on the frame for guided movement relative to the first element, the operating mechanism further comprising a jewel element which resides between the first and second elements so as to guide movement of the second element relative to the first element, wherein the operating mechanism comprises a line carrying spool that is rotatable around a first axis to retrieve line onto the line carrying spool, wherein the second element comprises a shaft on the spool and having a first end and a first free edge, the first end of the spool extends through the jewel element, there is a second jewel element in the form of an end washer and the first free edge abuts the second jewel element.

32. A fishing reel comprising:

a frame;

an operating mechanism on the frame; and a first element that is one of a) a part of the frame and b) mounted on the frame, the operating mechanism comprising a second element mounted on the frame for guided movement relative to the first element, the operating mechanism further comprising a jewel element which resides between the first and second elements so as to guide movement of the second element relative to the first element, wherein the jewel element defines a cup-shaped reservoir to receive a lubricant.

* * * * *